A. H. MEHRINGS.
STEERING DEVICE FOR FARM TRACTORS.
APPLICATION FILED FEB. 8, 1916.
1,211,332.
Patented Jan. 2, 1917.
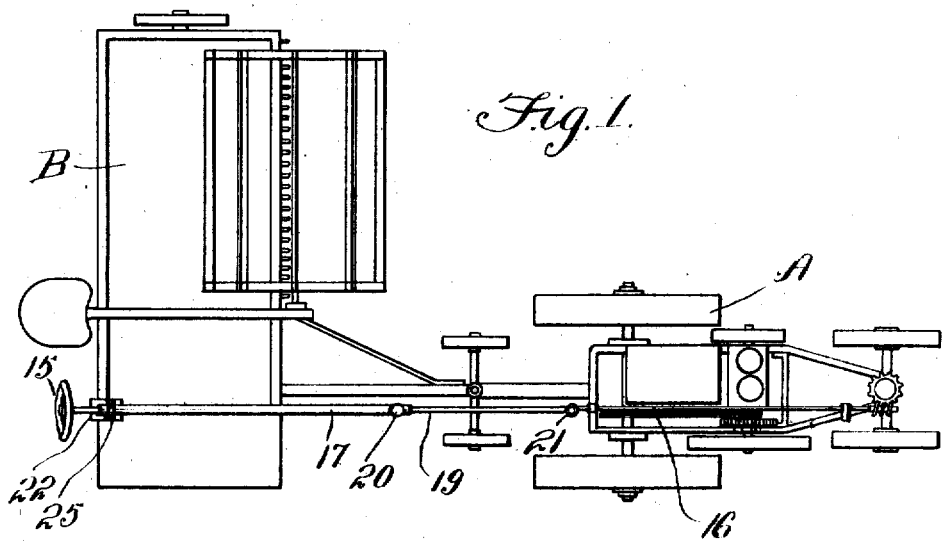
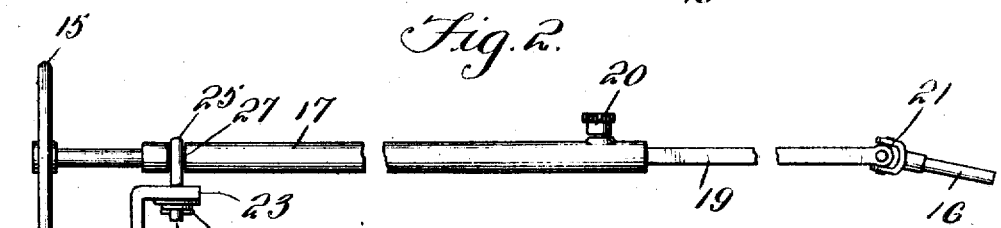
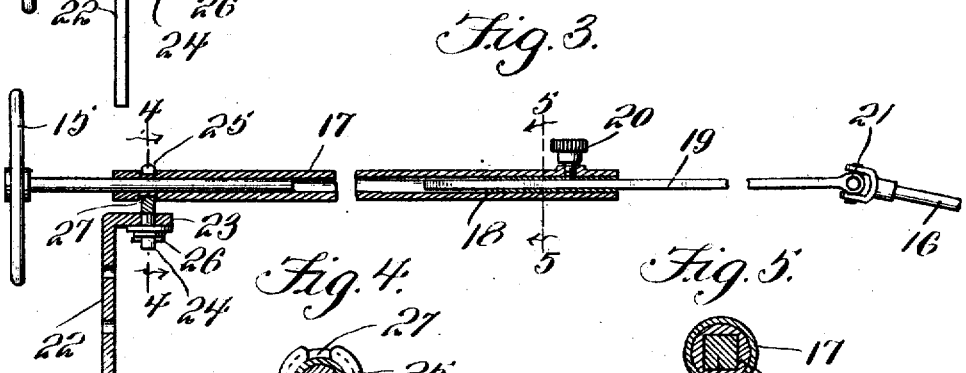
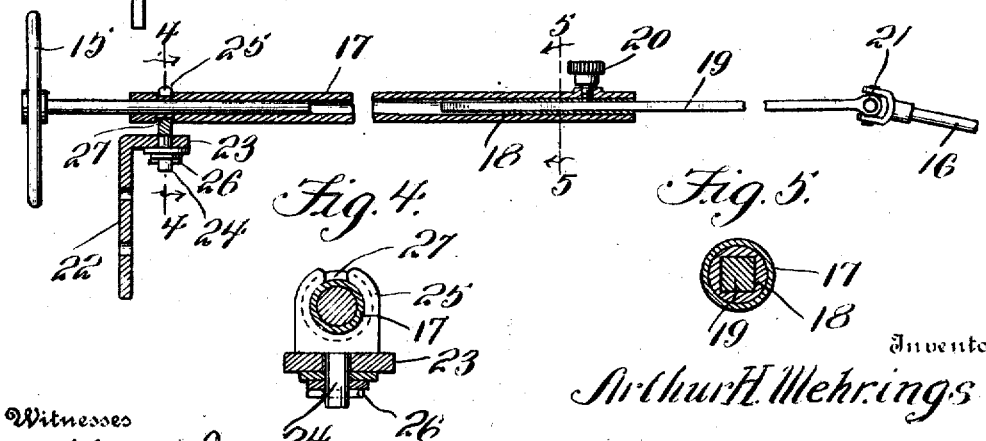

UNITED STATES PATENT OFFICE.

ARTHUR H. MEHRINGS, OF BENSON, ILLINOIS.

STEERING DEVICE FOR FARM-TRACTORS.

1,211,332.  Specification of Letters Patent.  Patented Jan. 2, 1917.

Application filed February 6, 1916. Serial No. 77,099.

*To all whom it may concern:*

Be it known that I, ARTHUR H. MEHRINGS, a citizen of the United States, residing at Benson, in the county of Woodford and State of Illinois, have invented new and useful Improvements in Steering Devices for Farm-Tractors, of which the following is a specification.

This invention relates to a steering device for farm tractors, and it has for its object to produce a simple and improved device of this class whereby the operator of a grain binder or other agricultural machine which is being drawn over the ground by a tractor may be enabled to steer and control such tractor, thus enabling the labor of one man to be dispensed with.

A further object of the invention is to produce a steering device of simple and improved construction which may be readily installed on or connected with the steering apparatus of an ordinary farm tractor so as to enable the same to be controlled by the operator of an agricultural machine which is hitched to the tractor.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a diagrammatic plan view of a binder and tractor to which the invention has been applied. Fig. 2 is a view in side elevation of the improved steering apparatus. Fig. 3 is a longitudinal sectional view of the same. Fig. 4 is a transverse sectional view taken on the line 4—4 in Fig. 3. Fig. 5 is a sectional detail view taken on the line 5—5 in Fig. 3.

Corresponding parts in the several figures are denoted by like characters of reference.

The steering wheel 15 which is removed from the steering rod 16 of the tractor is mounted on one end of a tubular rod or pipe 17 which may consist of an ordinary one-inch pipe, the same being provided at its other end with an internal sleeve 18 having a non-circular bore preferably square in cross section to accommodate a slidable extension rod 19 which is also non-circular, preferably square in cross section, so as to fit the sleeve in which the extension rod is slidable so that the said extension rod will telescope within the tube or pipe 17, the sleeve 18 being fixed firmly in said tube. A lubricator 20, preferably designed for the use of hard oil, is provided to lubricate the bore of the sleeve 18 so as to permit the extension rod 19 to slide freely therein. A universal joint 21 of conventional and well known construction is used to connect the extension rod 19 with the steering rod 16 of the tractor, the latter being diagrammatically shown at A.

An agricultural machine, such as a grain binder, which is conventionally shown at B, is equipped with an L-shaped bracket 22 mounted on the frame thereof, said bracket having a horizontal arm 23 which is apertured for the reception of the shank 24 of the fork member 25, said shank being swiveled in the arm 23 of the bracket where it may be secured by means of a pin or cotter 26. The fork member 25 engages an annular groove 27 in the tube 17 which latter, while free to rotate, will thus be prevented from longitudinal movement with respect to the bracket. The latter is mounted in such a position that the steering wheel 15 carried by the tube 17 will be conveniently accessible to the driver or operator.

As will be readily seen from the foregoing description, taken in connection with the drawing, the operator who is seated on the binder or other agricultural machine is enabled, by means of the steering wheel, to rotate the steering rod of the tractor, thereby controlling the movement of said tractor. When turns are being made and when for this reason the distance between the steering rod of the tractor and the bracket which supports the steering tube 19 is being varied, the extension rod 19 is free to slide or to telescope within the tubular steering rod, as will be readily seen, and said tubular steering rod is free to move angularly with respect to the bracket 22 owing to the fact that the fork or supporting member is swiveled on the arm of said bracket. The improved steering apparatus will thus adapt itself to any possible contingencies, and the slide joint whereby the extension rod 19 is connected with the tube 17 will be constantly lubricated so as to permit freedom of movement.

Having thus described the invention, what is claimed as new, is:—

1. In a device of the class described, a tubular steering rod having a hand wheel at one end and provided at the other end with a fixed internal sleeve having a bore of non-circular cross section, said tubular rod being provided with an annular groove near the end carrying the hand wheel, a support consisting of a bracket having an arm, and a fork engaging the annular groove in the tubular rod, said fork having an arm swiveled in the bracket, an extension rod of non-circular cross section, said rod having slidable connection with the sleeve at the end of the tubular steering rod, a permanent steering rod, and a universal joint connecting said permanent steering rod with the said extension rod.

2. In a device of the class described, a tubular steering rod having a hand wheel at one end and provided at the other end with a fixed internal sleeve having a bore of non-circular cross section, an extension rod of non-circular cross section slidably engaging the sleeve, and a lubricator engaging the tubular rod and the sleeve to supply lubricating material to the extension rod.

In testimony whereof I affix my signature in presence of two witnesses.

ARTHUR H. MEHRINGS.

Witnesses:
   R. C. FICKEN,
   JOSEPH KOCH.